Patented Aug. 4, 1953

2,647,879

UNITED STATES PATENT OFFICE 2,647,879

IMPROVING THE FLEX RESISTANCE OF BUTADIENE-1,3 TYPE POLYMERS

Robert L. Sibley, Nitro, W. Va., assignor to Monsanto Chemical Company, St. Louis, Mo., a corporation of Delaware No Drawing. Application April 18, 1950,
Serial No. 156,725

8 Claims. (Cl. 260—45.7)

The present invention relates to a method of treating a rubber to improve its properties.

The property of a rubber which is unique and which renders it useful for many industrial purposes where other materials would not be suitable at all is that of forcibly retracting to approximately its original size and shape after being greatly distorted. Thus, a rubber can not only be greatly extended but recovers its original size and shape after the stress is removed. Many rubber articles must undergo during use a very large number of distortions and recoveries. In fact, the life of rubber articles often is directly determined by the number of flexings the rubber will undergo before failure. In the case of natural rubber failure due to flexure is hastened by the usual deterioration brought about by exposure to air or oxygen. While synthetic rubbers are more resistant to oxidation, they are particularly susceptible to flexing failure due to the inherent properties of these polymers.

An object of the present invention is to improve rubber whether natural or synthetic. A particular object is to increase the flex life of a rubber. Another object is to provide a class of materials for treating a rubber which improve the rubber in one or more important respects, particularly as regards resistance to flex cracking. Another object is to increase the useful life of vulcanized rubber articles. Still other objects will be apparent from the description following.

These objects are accomplished in accordance with the present invention by treating the rubber with an organic mercaptan having a mercapto group linked to a methylene group. For example, it has been found that adding to the rubber a small proportion of an alkyl or aralkyl mercaptan increases many times the number of flexings which the rubber will undergo. The rubbers which may be improved by such treatment include natural rubber and synthetic rubber prepared by the emulsion polymerization in the presence of an emulsifying agent, polymerization catalyst and organic sulfur compound modifying agent of a material which consists predominately of a butadiene hydrocarbon, as for example butadiene, isoprene or dimethyl butadiene and which may also contain other compounds capable of copolymerizing with conjugated butadiene hydrocarbons. Typical examples of the latter are aryl olefines such as styrene and vinyl naphthalene and acrylic nitriles such as acrylonitrile and methacrylonitrile. This invention is particularly applicable to improving the flex life of sulfur vulcanizable rubber-like copolymers of butadiene-1,3 hydrocarbons, particularly emulsion copolymers of butadiene-1,3 and aryl olefines such as styrene, containing 10 to 45% by weight of aryl olefine. These products are prepared by polymerizing in aqueous emulsion a mixture of the monomers in the presence of an oxidizing polymerization catalyst, an organic sulfur compound modifying agent and an emulsifying agent. Typical modifiers are di-isopropyl xanthogen monosulfide, di-isopropyl xanthogen disulfide, di-isopropyl xanthogen polysulfide, di-2-ethyl hexyl disulfide, lauryl mercaptan, octyl mercaptan, and metal, ammonium and amine salts of dialkyl dithiocarbamates. A description of the preparation of polymers of butadiene and styrene in the presence of a mercaptan modifier may be found in U. S. Patent No. 2,281,613 to Wollthan and Becker. Throughout the specification it is to be understood that the term "a rubber" refers only to natural rubber and synthetic rubbers of the type defined prepared by emulsion polymerization in the presence of an organic sulfur compound modifier.

The following examples illustrate preferred embodiments of the invention and explain the practice thereof but are not to be taken as limitative.

An emulsion copolymer of butadiene and styrene was prepared in the presence of an organic sulfur compound as a modifier, the charge comprising:

| | | |
|---|---|---|
| Butadiene | g | 180.0 |
| Styrene | g | 70.0 |
| Distilled water | g | 600.0 |
| Soap flakes | g | 12.5 |
| 3% Potassium persulfate solution | cc | 25.0 |
| Dodecyl mercaptan | cc | 1.48 |

Polymerization was effected by rotating these ingredients in a glass bottle about an axis perpendicular to its length at 60° C. The resultant dispersion was coagulated, and the coagulum washed and dried, 1% by weight based on the weight of the dry polymer of N phenyl beta naphthalamine being added as antioxidant.

From the copolymer so prepared vulcanizable stocks were compounded comprising:

| | Parts by weight | |
|---|---|---|
| Copolymer | 100.0 | 100.0 |
| Carbon black | 50.0 | 50.0 |
| Zinc oxide | 5.0 | 5.0 |
| Stearic acid | 0.5 | 0.5 |
| N-Cyclohexyl benzothiazole sulfenamide | 1.0 | 1.0 |
| Sulfur | 2.0 | 2.0 |
| n-Butyl mercaptan | | 1.0 |

The stocks so compounded were cured in the usual manner by heating in a press for 60 minutes at the temperature of 45 pounds steam per square inch and the cured stocks artificially aged by heating for 7 days at 70° C. in a circulating air oven. The flexing characteristics of the vulcanized aged stocks were determined by means of a Firestone flexing machine as described by L. V. Cooper, Analytical Edition of Industrial & Engineering Chemistry, vol. 2, No. 4, 1930, pages 391–394. The stock containing no butyl mercaptan was arbitrarily assigned a value of 100. On this basis the flexing characteristics of the stocks compared as follows:

| Mercaptan Added | Flexing |
| --- | --- |
| None | 100 |
| n-Butyl mercaptan | 164 |

It will be noted that the addition of a mercaptan to a copolymer prepared in the presence of a mercaptan as modifier effects a still further improvement in the flex life of the cured products. The presence of an organic sulfur compound during polymerization is essential and cannot be replaced by free sulfur since the presence of sulfur during the polymerization adversely affects the flexing properties as compared to an organic sulfur compound modifier. For example a copolymer was prepared as follows: 112.5 parts by weight of butadiene and 37.5 parts by weight of styrene, 0.75 parts by weight of sulfur, 33 parts by weight of carbon tetrachloride and 0.75 parts by weight of benzoyl peroxide were dispersed in 191 parts by weight of water containing 20 parts by weight of a commercial emulsifying agent which contained 60% cetyl trimethyl ammonium bromide and 0.45 parts by weight of acetic acid and polymerized for 64.5 hours at 60° C. by rotating the glass bottle containing the aforesaid ingredients about an axis perpendicular to its length. The resultant dispersion was coagulated employing alcohol. The coagulum was then washed with water and dried on a warm mill, 1% by weight based upon the weight of the dried copolymer of N-phenyl beta naphthylamine being added as an antioxidant. A vulcanizable stock similar to the above stock was compounded comprising

| | Parts by weight |
| --- | --- |
| Copolymer | 100.0 |
| Carbon black | 50.0 |
| Zinc oxide | 5.0 |
| Stearic acid | 0.5 |
| N-cyclohexyl-2-benzothiazole sulfenamide | 1.0 |
| Sulfur | 2.0 |

The stock was cured by heating for 60 minutes at the temperature of 45 pounds steam pressure per square inch and the flexing characteristics both normal and after aging 7 days at 70° C. in a circulating air oven determined in the manner described. The flexings before failure of the normal and aged stocks were only 29% and 36% respectively of those of the copolymer prepared in the presence of a mercaptan modifier.

A commercial preparation of an emulsion copolymer of butadiene and styrene prepared in the presence of an organic sulfur modifying agent showed ever greater response to the addition of a mercaptan to the vulcanizable stock.

A base stock was compounded comprising:

| | Parts by weight |
| --- | --- |
| Copolymer[1] | 100.0 |
| Carbon black | 50.0 |
| Zinc oxide | 5.0 |
| Stearic acid | 0.5 |
| Sulfur | 2.0 |
| N-cyclohexyl-2-benzothiazole sulfenamide | 1.0 |

[1] Commercial sample of rubber-like copolymer of butadiene and styrene prepared in an aqueous emulsion in the presence of an emulsifying agent, a polymerization catalyst, and an organic mercaptan modifying agent.

From the base stock so compounded typical stocks were prepared according to the principles of this invention by adding 1.0 part by weight of various mercaptans. The stocks so compounded were cured in the usual manner by heating in a press for 60 and 90 minutes at the temperature of 45 pounds steam pressure per square inch. The flexing characteristics of the vulcanized stocks were determined unaged and after aging 7 days in an oven at 70° C. by means of the Firestone flexing machine. The results are summarized in the table below. The figures are the average flexings of the two test pieces. The unaged flexings were stopped after 927,000 flexings and the aged flexings after 644,000 flexings. In other words a figure of 927 under the unaged flexings indicates that neither test piece had broken.

Table I

| Mercaptan added | Flexings in kilocycles | | | |
| --- | --- | --- | --- | --- |
| | Unaged Stocks of— | | Aged Stocks of— | |
| | 60 min. cure | 90 min. cure | 60 min. cure | 90 min. cure |
| None | 54 | 184 | 85 | 54 |
| Butyl mercaptan | 780 | 787 | 604 | 594 |
| Heptyl mercaptan | 927 | 927 | 545 | 546 |
| Lauryl mercaptan | 812 | 841 | 609 | 644 |

This remarkable increase in flex life is brought about not only by the addition to the rubber of the aforementioned mercaptans but by alkyl and aralkyl mercaptans in general. For example 1.0 part of tetra hydro naphthyl methyl mercaptan gave results substantially identical with those obtained with heptyl mercaptan.

As further examples of the invention a rubber base stock was compounded comprising:

| | Parts by weight |
| --- | --- |
| Smoked sheets rubber | 100.0 |
| Carbon black | 50.0 |
| Zinc oxide | 5.0 |
| Sulfur | 3.0 |
| Stearic acid | 3.0 |
| Pine tar | 2.0 |
| Condensation product acetone and p-amino diphenyl | 1.0 |
| 2,2' diethio bis benzothiazole | 0.7 |

From the base stock so compounded typical stocks were prepared according to the principles of this invention by adding 1.0 part by weight of various mercaptans. The stocks so compounded were cured in the usual manner by heating in a press for 75 and 90 minutes at the temperature of 30 pounds steam pressure per square inch. The resistance to flex cracking of the vulcanized products was determined on a Firestone flexing machine. The determinations were made on unaged stocks and on the stocks after aging 7 days in an oven at 70° C. The figures below are the average number of flexings of two test pieces in kilocycles which the stocks underwent before failure. The flexing of the unaged stocks was stopped after 384,000 flexings and the aged stocks after 239,000 flexings.

*Table II*

| Mercaptan added | Flexings in kilocycles | | | |
|---|---|---|---|---|
| | Unaged Stocks of— | | Aged Stocks of— | |
| | 75 min. cure | 90 min. cure | 75 min. cure | 90 min. cure |
| None | 361 | 314 | 205 | 126 |
| Lauryl mercaptan | 384 | 378 | 239 | 218 |
| Butyl mercaptan | 384 | 368 | 228 | 213 |
| Heptyl mercaptan | 384 | 378 | 234 | 202 |

It will be seen that the addition of the mercaptans to the rubber increased many times the number of flexings which the rubber underwent before failure.

Typical examples of other mercaptans which can be used in the practice of this invention comprise ethyl mercaptan, mercapto acetic acid, isopropyl mercaptan, amyl mercaptan, hexyl mercaptan, benzyl mercaptan, mercapto methyl naphthalene, mercapto methyl isopropyl benzene and decyl mercaptan. As little as 0.1 per cent on the rubber exerts a noticeable improvement in flex cracking resistance. It is generally not desirable to add more than about 5% on the rubber of mercaptan but up to a certain point the tensile and elasticity of the vulcanizates are actually improved by increasing amounts, especially after exposure to heat. Physical data of typical stocks containing 3 parts mercaptan are set forth below.

Stocks were compounded comprising:

| Stock | A | B | C |
|---|---|---|---|
| Copolymer [1] parts by weight | 100 | 100 | 100 |
| Carbon black do | 40 | 40 | 40 |
| Zinc oxide do | 3 | 3 | 3 |
| Sulfur do | 1.75 | 1.75 | 1.75 |
| N-Cyclohexyl 2-benzothiazole sulfenamide parts by weight | 1.2 | 1.2 | 1.2 |
| Saturated hydrocarbon softener do | 4 | 4 | 4 |
| Mineral rubber do | 4 | 4 | 4 |
| t-Butyl mercaptan do | | 3 | |
| Lauryl mercaptan do | | | 3 |

[1] Commercial sample of rubber-like copolymer of butadiene-1,3 and styrene prepared in an aqueous emulsion in the presence of an emulsifying agent, a polymerization catalyst, and an organic mercaptan modifying agent.

The stocks were vulcanized in the usual manner by heating 90 minutes in a press at 142° C. and samples of the cured products aged by heating 24 hours in an oven at 100° C.

*Table III*

| Stock | Modulus of Elasticity in lbs./in.$^2$ at Elongation of 300 Percent | Tensile at Break in lbs./in.$^2$ | Ultimate Elongation, Percent |
|---|---|---|---|
| Unaged: | | | |
| A | 850 | 2,075 | 510 |
| B | 720 | 2,460 | 590 |
| C | 540 | 2,110 | 615 |
| Aged: | | | |
| A | 1,025 | 2,040 | 370 |
| B | 1,300 | 2,825 | 495 |
| C | 1,000 | 2,747 | 550 |

The flex cracking resistance of the vulcanized products was determined and it was found that the B and C stocks could be flexed 3,000–4,000 more times than the A or control stock before failure. The flex-cracking resistance was determined at 90° C. on an India flexing machine described by Torrance and Peterson, India Rubber World 80, 62 (1929). While standard India flexing specimens were employed, the usual procedure was varied to conform with that recently found to give more reproducible results with synthetic rubber. A $\frac{3}{32}''$ slit was cut in the center of the flexing specimen and the number of kilocycles to failure measured, i. e. the number of kilocycles required to make the slit grow the entire width of the specimen.

Obviously, practice of this invention is not limited to the specific compositions set forth to illustrate the invention. The mercaptans of this invention may be employed in conjunction with other vulcanizing agents and other accelerators than those specifically disclosed for this invention is applicable to rubber compositions of the most varied sort. While the usual method of adding the mercaptans to the rubber is to incorporate them in the rubber by milling or similar process, they may be added to a dispersion of a rubber, as for example, a natural rubber latex or a synthetic rubber latex, before coagulation or applied to the surface of a mass of crude or vulcanized rubber.

The present invention is a continuation-in-part of application Serial No. 555,393, filed September 22, 1944, now abandoned.

What is claimed is:

1. The method of retarding deterioration due to flexing of a rubber selected from the group consisting of India rubber, rubber-like homopolymers of butadiene-1,3 hydrocarbons, and rubber-like copolymers of butadiene-1,3 hydrocarbons and aryl olefins copolymerizable therewith of which the major portion is the butadiene-1,3 hydrocarbon, which comprises incorporating therein 0.1 to 5% on the rubber of an organic mercaptan having a mercapto group linked to a methylene group, said rubber-like polymers of and copolymers containing butadiene-1,3 hydrocarbons being prepared in an aqueous emulsion in the presence of an emulsifying agent, a polymerization catalyst and an organic sulfur compound modifying agent.

2. The method of retarding deterioration due to flexing of a rubber selected from the group consisting of India rubber, rubber-like homopolymers of butadiene-1,3 hydrocarbons, and rubber-like copolymers of butadiene-1,3 hydrocarbons and aryl olefins copolymerizable therewith of which the major portion is the butadiene-1,3 hydrocarbon, which comprises incorporating therein 0.1 to 5% on the rubber of an alkyl mercaptan, said rubber-like polymers of and copolymers containing butadiene-1,3 hydrocarbons being prepared in an aqueous emulsion in the presence of an emulsifying agent, a polymerization catalyst and an organic mercaptan modifying agent.

3. The method of retarding deterioration due to flexing of a rubber selected from the group consisting of India rubber, rubber-like homopolymers of butadiene-1,3 hydrocarbons, and rubber-like copolymers of butadiene-1,3 hydrocarbons and aryl olefins copolymerizable therewith of which the major portion is the butadiene-1,3 hydrocarbon, which comprises incorporating therein 0.1 to 5% on the rubber of an aralkyl mercaptan, said rubber-like polymers of and copolymers containing butadiene-1,3 hydrocarbons being prepared in an aqueous emulsion in the presence of an emulsifying agent, a polymerization catalyst and an organic mercaptan modifying agent.

4. The method of retarding deterioration due to flexing of India rubber which comprises incorporating therein 0.1 to 5% on the rubber of an alkyl mercaptan.

5. The method of retarding deterioration due to flexing of a rubber-like copolymer of butadiene-1,3 and styrene, the major proportion being butadiene, prepared in an aqueous emulsion in the presence of an emulsifying agent, a polymerization catalyst, and an organic mercaptan modifying agent, which comprises incorporating therein 0.1 to 5% on the rubber of an alkyl mercaptan.

6. The method of retarding deterioration due to flexing of a rubber-like copolymer of butadiene-1,3 and styrene, the major proportion being butadiene, prepared in an aqueous emulsion in the presence of an emulsifying agent, a polymerization catalyst, and an organic mercaptan modifying agent, which comprises incorporating therein 0.1 to 5% on the rubber of butyl mercaptan.

7. The method of retarding deterioration due to flexing of a rubber-like copolymer of butadiene-1,3 and styrene, the major proportion being butadiene, prepared in an aqueous emulsion in the presence of an emulsifying agent, a polymerization catalyst, and an organic mercaptan modifying agent, which comprises incorporating therein 0.1 to 5% on the rubber of heptyl mercaptan.

8. The method of retarding deterioration due to flexing of a rubber-like copolymer of butadiene-1,3 and styrene, the major proportion being butadiene, prepared in an aqueous emulsion in the presence of an emulsifying agent, a polymerization catalyst, and an organic mercaptan modifying agent, which comprises incorporating therein 0.1 to 5% on the rubber of lauryl mercaptan.

ROBERT L. SIBLEY.

References Cited in the file of this patent

UNITED STATES PATENTS

| Number | Name | Date |
|---|---|---|
| 2,234,204 | Starkweather et al. | Mar. 11, 1941 |
| 2,281,613 | Wollthan et al. | May 5, 1942 |